Figure 7:
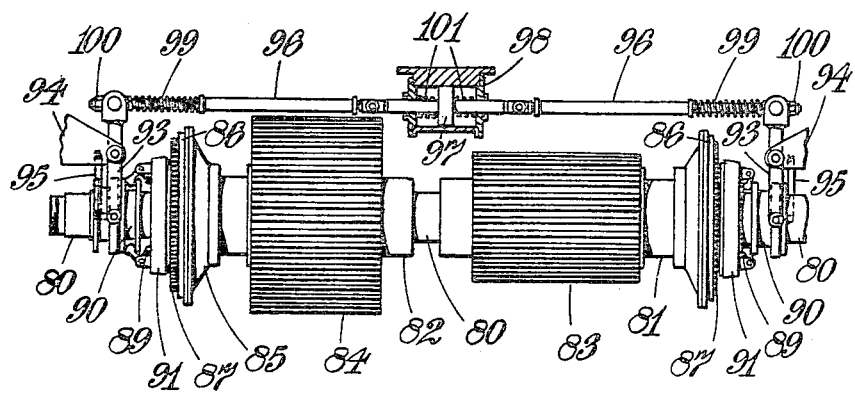

April 10, 1956
A. H. FLETCHER ET AL
2,741,351
POWER TRANSMISSION SYSTEMS
Filed Dec. 8, 1952
7 Sheets-Sheet 1
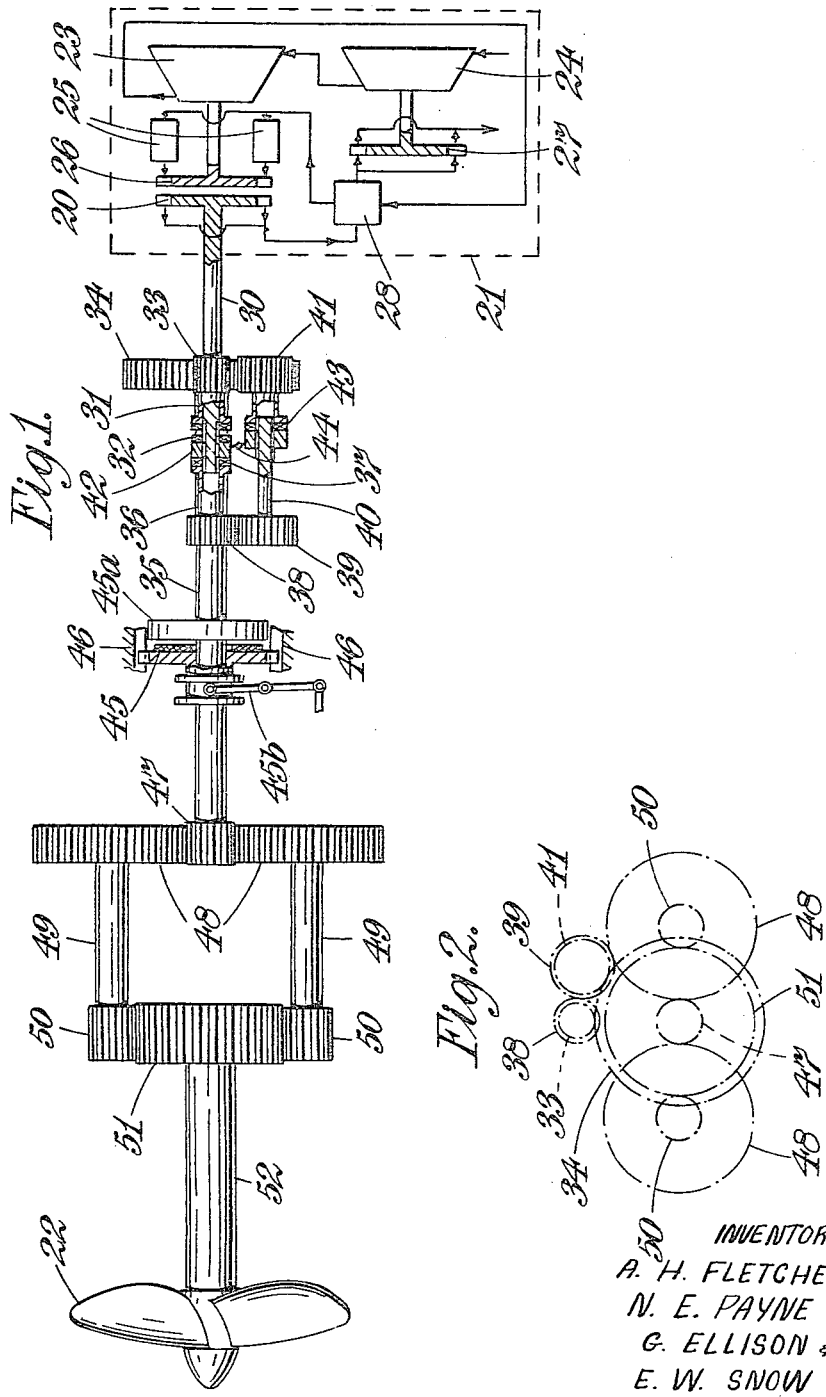
INVENTORS
A. H. FLETCHER &
N. E. PAYNE &
G. ELLISON &
E. W. SNOW
BY Wilkinson & Mawhinney
ATTYS.

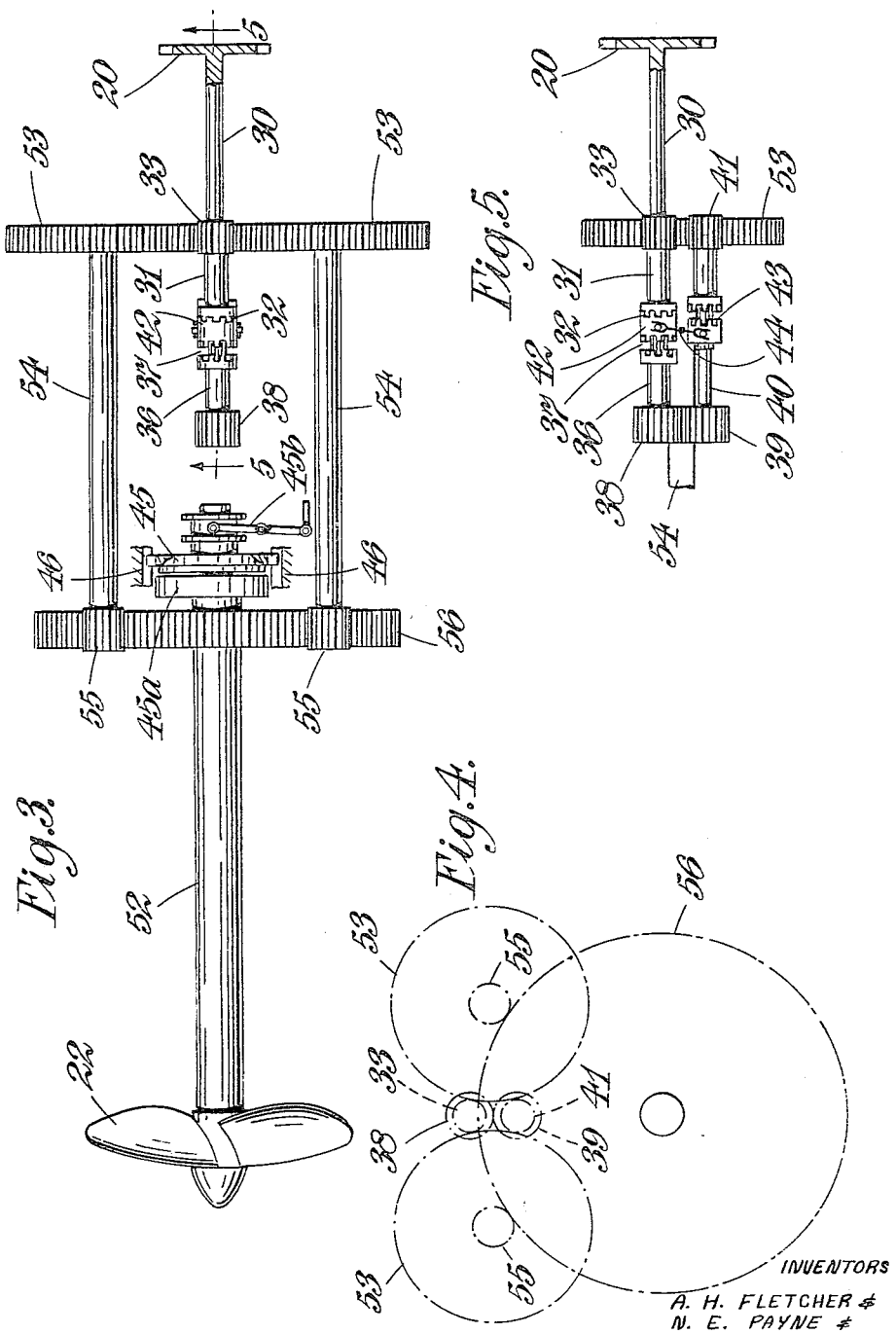

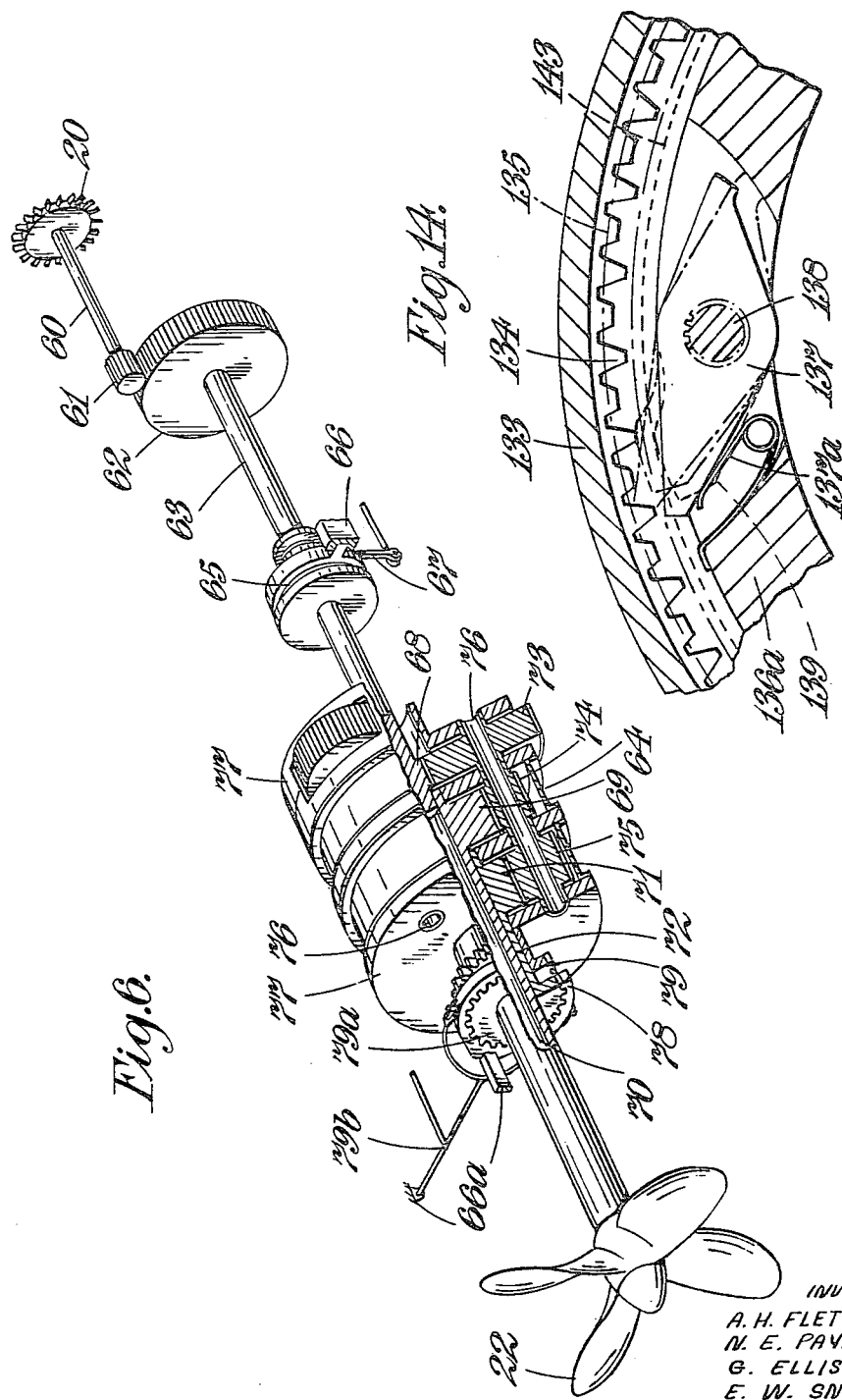

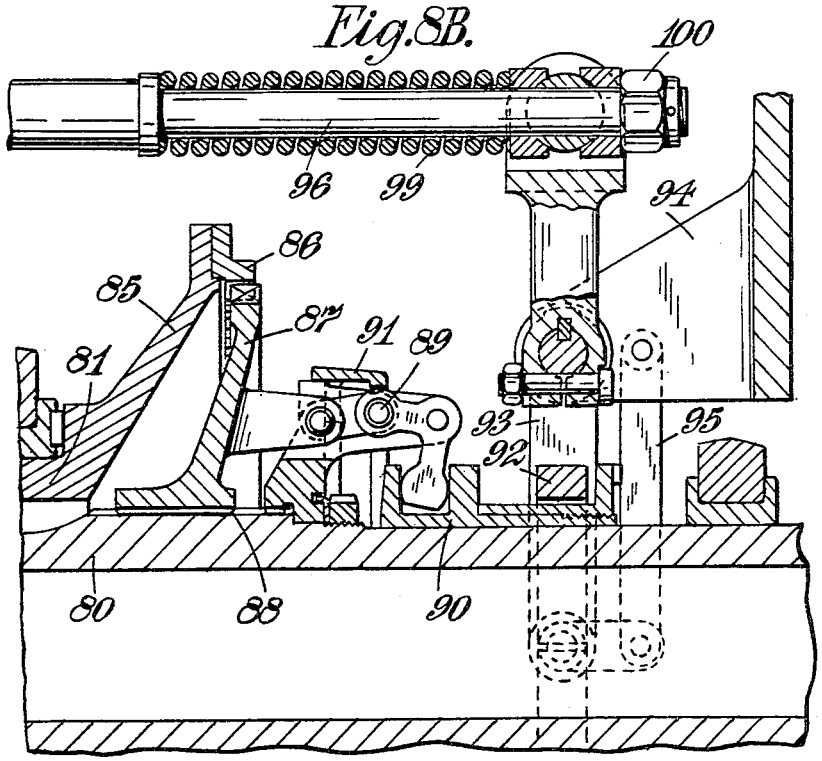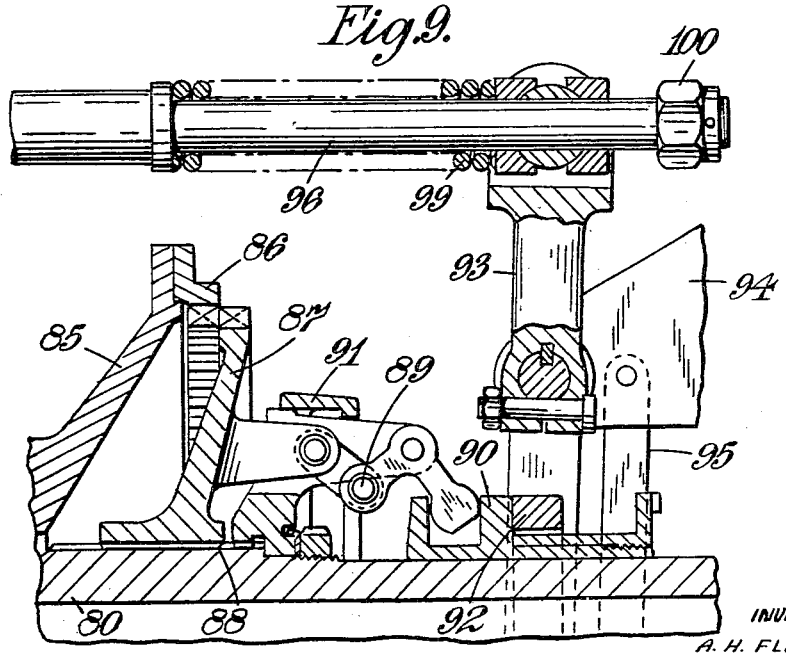

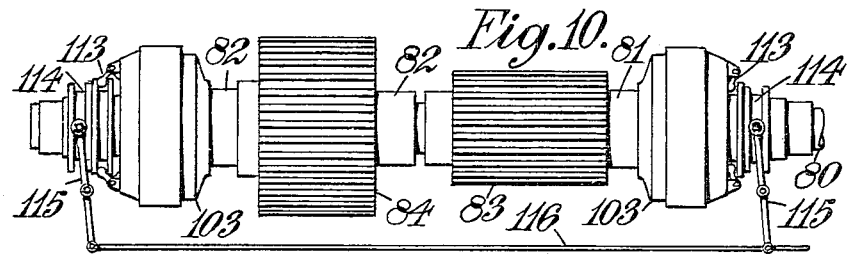
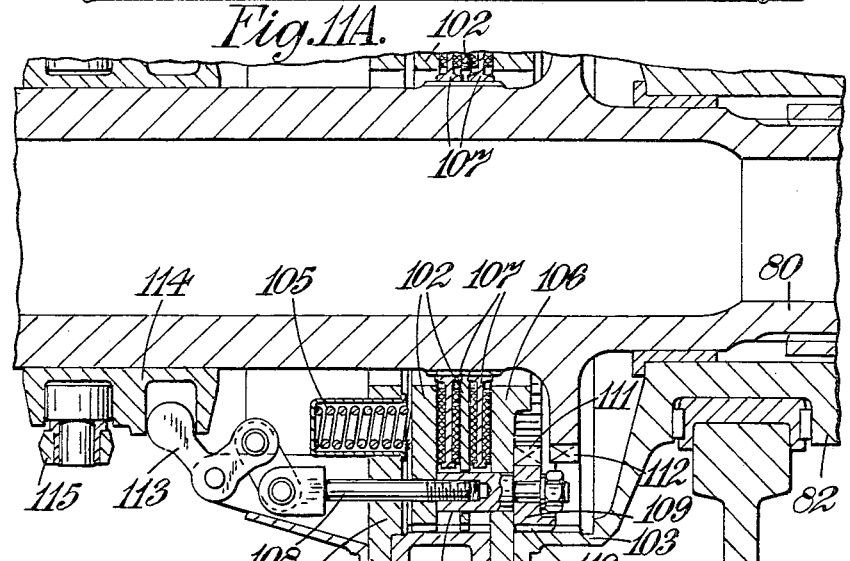
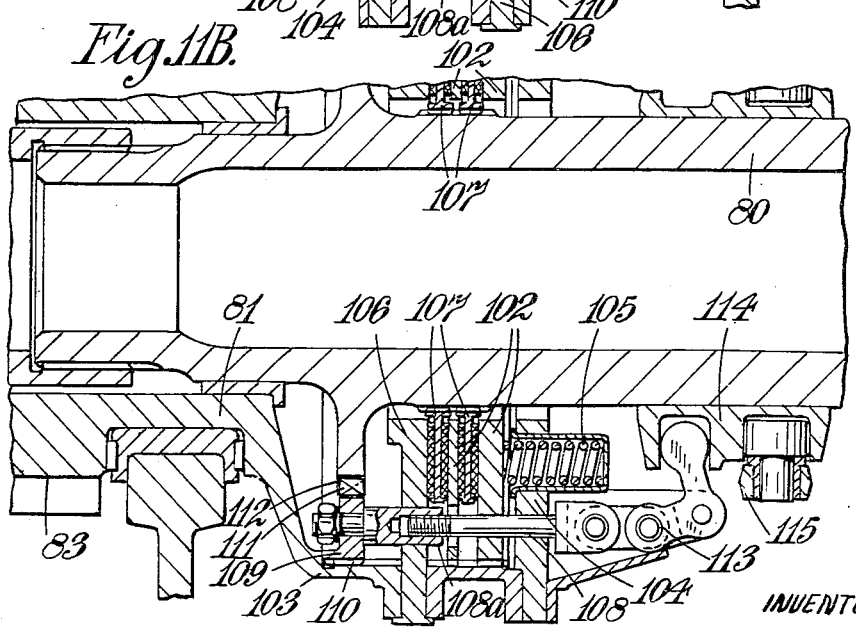
INVENTORS
A. H. FLETCHER & N. E. PAYNE &
G. ELLISON & E. W. SNOW
BY Wilkinson & Mawhinney
ATTYS.

April 10, 1956  A. H. FLETCHER ET AL  2,741,351
POWER TRANSMISSION SYSTEMS
Filed Dec. 8, 1952  7 Sheets-Sheet 7
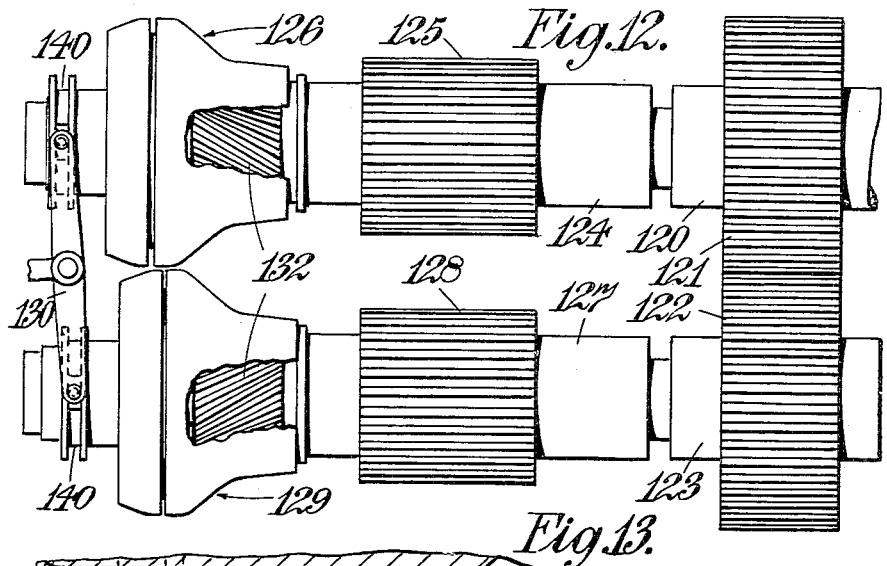
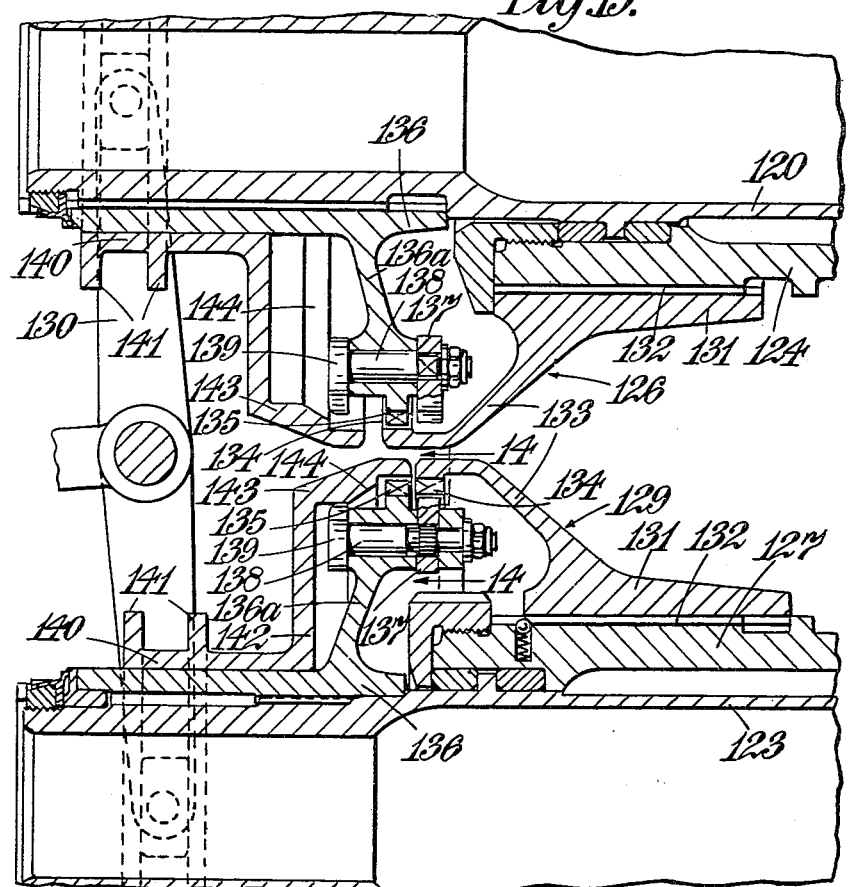
INVENTORS
A. H. FLETCHER & N. E. PAYNE &
G. ELLISON & E. W. SNOW
BY Wilkinson & Mawhinney
ATTYS.

United States Patent Office 2,741,351
Patented Apr. 10, 1956

2,741,351

POWER TRANSMISSION SYSTEMS

Arthur Holmes Fletcher, Derby, Nigel Edward Payne, Burton-on-Trent, George Ellison, Allestree, and Ernest William Snow, Manchester, England, assignors to Rolls-Royce Limited, Derby, England, a British company Application December 8, 1952, Serial No. 324,722

Claims priority, application Great Britain December 7, 1951

8 Claims. (Cl. 192—4)

This invention relates to turbine engines for marine use of the kind having a power turbine which is connected through gearing to a non-reversible-pitch marine propeller to drive it. The turbine engine may be a gas turbine engine or a steam turbine engine, and in the case of a gas turbine engine the power turbine will usually be rotatable independently of any compressor-driving turbine of the engine, but may in certain cases be connected to a compressor of the engine to drive it as well as the propeller.

According to this invention in one aspect, a turbine engine of the kind having a power turbine which is connected through gearing to a non-reversible-pitch marine propeller to drive it comprises a transmission between the power turbine and the propeller including an input shaft directly coupled to the power turbine to be driven thereby, an output shaft carrying the propeller and driving it, gearing drivingly interconnecting said input and output shafts arranged to afford a first gear train through which the drive is transmitted in one direction of rotation and a second gear train through which the drive transmitted in the opposite direction of rotation, clutch means for selective engagement of said first and second gear trains, braking means for bringing the assembly including the propeller and the power turbine to a standstill, operating means for the brake, and operating means for the clutch by which the changeover of drive from one of said gear trains to the other is effected when the assembly has been brought to a standstill.

Preferably means is provided to prevent "running away" of any part of the transmission whilst another part of the transmission is stopped by the braking means and during change from running in one direction to running in the opposite direction. Conveniently each of the gear trains may be provided with associated clutch mechanisms and the clutch mechanisms may be arranged so that one only becomes disengaged after the other has become engaged.

Some embodiments of transmission according to this invention will now be described with reference to the accompanying drawings, in which—

Figure 8A:
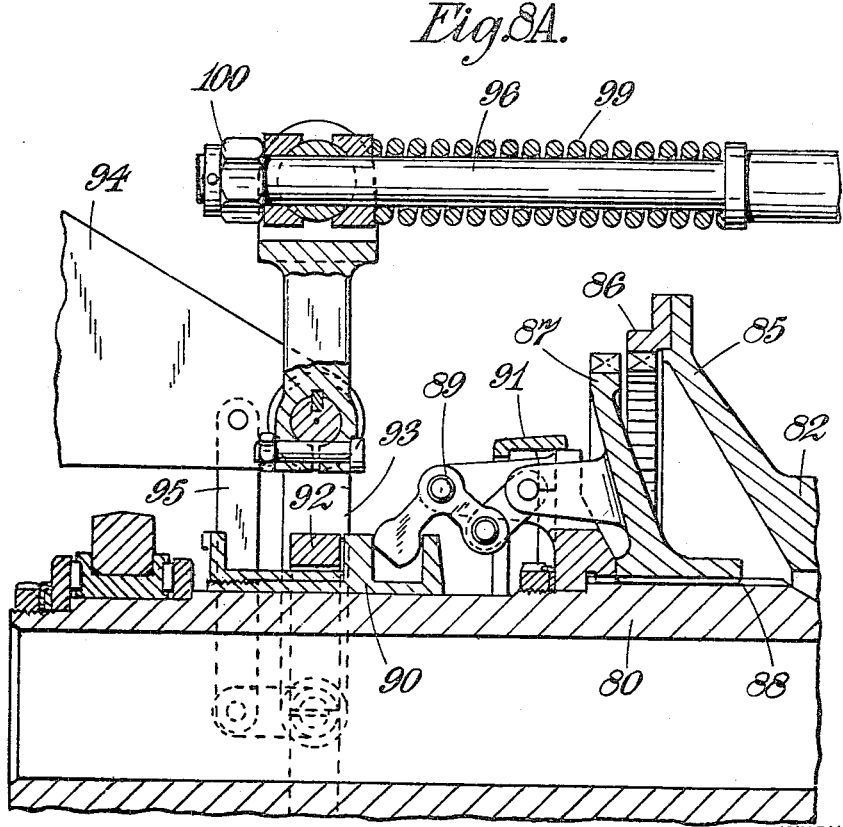

Figure 1 illustrates diagrammatically a first embodiment of transmission together with power plant suitable for driving it, Figure 2 illustrates diagrammatically an end view of the gear train forming part of Figure 1, Figure 3 illustrates a second embodiment of transmission according to this invention, Figure 4 is a diagrammatic illustration of the gear train forming part of Figure 3, Figure 5 is a section on the line 5—5 of Figure 3, Figure 6 is a perspective view of another embodiment according to this invention, Figure 7 illustrates one practical embodiment of coupled clutches suitable for use in the transmissions of Figures 1 to 5, Figures 8A and 8B are axial sections through the arrangement of Figure 7 drawn to a larger scale to show the details of the clutch mechanisms, Figure 9 is a view corresponding to Figure 8B showing the parts in an alternative position, Figure 10 illustrates another clutch arrangement suitable for use in the transmissions of Figures 1 to 5.

Figures 11A and 11B are axial sections through the clutch mechanisms of the arrangement of Figure 10, Figure 12 illustrates yet another clutch arrangement suitable for use with the transmissions of Figures 1 to 5, Figure 13 is a section through the arrangement of Figure 12 in the plane of the axes of the parallel shafts illustrated in Figure 12, and Figure 14 is a section on the line 14—14 of Figure 13.

Referring to Figures 1 and 2 of the drawings there is shown a transmission comprising a three-stage reduction gear between the power turbine 20 of a marine power plant 21 and a marine propeller 22.

The power plant is installed in a ship and in the embodiments to be described comprises a gas producer unit including at least one compressor delivering to combustion equipment, the products of combustion passing to a turbine which is connected to drive the compressor. The products of combustion also drive the power turbine. It will be understood that the invention is not limited to transmissions for gas turbine engines, and may be applied to a steam turbine engine.

In the known arrangement illustrated, the plant 21 comprises a high-pressure compressor 23 arranged in series with a low-pressure compressor 24 which draws in air from the atmosphere; the high-pressure compressor 23 delivers the compressed air to combustion equipment 25, and the combustion products flow to a high-pressure turbine 26, which is connected to the high-pressure compressor 23 to drive it, and then flow to a low-pressure turbine 27, which is connected to the low-pressure compressor 24 to drive it, the power turbine 20 being arranged in series between the high-pressure turbine 26 and low-pressure turbine 27. The power plant 21 may also comprise heat exchange apparatus 28 by which the compressed air from compressor 23 is heated prior to passing into the combustion equipment 25, the heat being obtained from the exhaust gases from one of the turbines, indicated in the drawing as the power turbine 20. The working fluid may also be reheated between the high-pressure turbine 26 and low-pressure turbine 27.

The power turbine 20 drives the high-speed shaft 30 which has, for part of its length, a second high-speed shaft 31 coaxially outside it to which it can be drivingly connected by clutch 32. The second shaft 31 has secured thereto a high-speed pinion 33 which is arranged to be constantly in mesh with a gear 34 of larger pitch circle diameter carried by an intermediate-speed shaft 35 parallel to but offset from the high-speed shaft 30. Coaxial with the high-speed shaft 30, and beyond the second shaft 31, is a third high-speed shaft 36, which can be connected to the high-speed shaft 30 through a second clutch 37. It is arranged that, when a drive is transmitted from the high-speed shaft 30 to the second high-speed shaft 31, no drive is transmitted to the third high-speed shaft 36, and that, when a drive is transmitted from the high-speed shaft 30 to the third high-speed shaft 36, no drive is transmitted to the second high-speed shaft 31. The third high-speed shaft 36 carries a high-speed pinion 38 which meshes with a pinion 39 carried by a high-speed layshaft 40. A second pinion 41 carried by the layshaft 40 meshes with the gear 34 on intermediate-speed shaft 35.

The high-speed shaft 30 may as shown carry a single clutch member 42, which is shifted to engage selectively the clutch 32 to the second shaft 31 and the clutch 37 to the third shaft 36; however two separate clutch members may be provided driven by the high-speed shaft 30 which clutch members are arranged for co-ordinated movement.

It will be appreciated that, dependent on whether the high-speed shaft 30 is clutched to the second high-speed shaft 31 or the third high-speed shaft 36, the drive from the high-speed shaft 30 will be transmitted either through the second high-speed shaft 31 to the intermediate-speed shaft 35, causing it to rotate in one direction, or through the third high-speed shaft 36 and the high-speed layshaft 40 to the intermediate-speed shaft 35, causing the latter to rotate in the other direction.

A clutch 43 may as shown be provided between parts of the layshaft 40 carrying the two pinions 39, 41, which clutch is engaged when the drive is transmitted through the layshaft 40 but which is otherwise disengaged, so that the pinion 38 on the third high-speed shaft 36 and the layshaft pinion 39 meshing therewith do not rotate continuously when the drive is being transmitted through the second shaft. The clutch 43 may be coupled for operation with the clutches 32, 37 as indicated at 44.

The intermediate-speed shaft, which may be considered as the output shaft from a high-speed reduction gear train, has associated therewith a brake 45, 45a which is designed to bring the whole assembly to a standstill. The brake has the part 45 anchored to stationary structure 46 of the vessel and has the part 45a rotating with shaft 35. The brake is applied through mechanism 45b.

At its end remote from the high-speed reduction gear train, the intermediate-speed shaft carries a pinion 47 which meshes with two gears 48 of larger pitch circle diameter. It is arranged that each of the gears 48 drives a low-speed intermediate shaft 49, and the two low-speed intermediate shafts 49 carry at their other ends pinions 50 both of which mesh with a gear 51 of larger pitch circle diameter which is carried by the low-speed, or output shaft 52 of the whole gear train. The low-speed output shaft carries the marine propeller 22 at its other end.

Conveniently the pinions and gears referred to are either straight or helical spur gears, and in this case the two low-speed intermediate shafts 49 will be arranged to be parallel; preferably their axes will be in the same horizontal plane.

In order to reverse the direction of rotation of the marine propeller 22 while the direction of rotation of the power turbine 20 remains the same, the assembly is brought to a standstill by application of the brake 45, 45a, and a clutch 32 or 37 actuated to disengage either the second high-speed shaft 31 or the third high-speed shaft 36 (whichever is at the moment being driven) from the high-speed shaft 30. The high-speed shaft is then engaged by means of the co-operating clutches with the other of the two shafts 31, 36, in such a manner as to avoid the possibility of the power turbine 20 "running away" during the period in which the gear is changed. In this manner the water milling of the marine propeller 22 due to the motion of the vessel is overcome by the action of the brake 45, 45a, which also brings the power turbine 20 to a standstill before the high-speed shaft 30 is de-clutched from the shaft 31 or 36 which it is driving and is clutched to the other 36 or 31 to reverse the direction of rotation of the propeller 22.

Referring now to Figures 3 to 5, there is illustrated an arrangement having only two reduction stages as opposed to three in the embodiment of Figures 1 and 2. The arrangement has a high-speed section similar to that of the arrangement of Figures 1 and 2 and the same references are employed to designate the corresponding parts in the two arrangements. In the present arrangement, instead of the high-speed pinion 33 on the second high-speed shaft and the pinion 41 on the high-speed layshaft 40 being in mesh with a single large diameter gear, the pinions 33, 41 mesh with a pair of large diameter gears 53, both of which drive intermediate-speed shafts 54 each carrying at its other end a further pinion 55. The pinions 55 mesh with a gear 56 of larger pitch circle diameter which is carried by the low-speed or propeller shaft 52, which carries the marine propeller at its other end. The arrangement of the reversing clutches 32, 37, 43 may be identical in this arrangement with that in the arrangement already described.

In this case, the brake 45, 45a, is conveniently carried by the low-speed shaft 52, in view of the fact that two intermediate-speed shafts 54 are provided. It will be appreciated that the desired speed reduction is obtained by the selection of the sizes of the pinions and gears, the parallel shafts 54 being suitably spaced.

It is convenient to arrange the intermediate-speed shafts 54 in the same horizontal plane, in order to facilitate assembly of the shafts and gearing in the casing, and also if the arrangement permits, as is the case with the arrangement of Figure 1, to arrange the parallel shafts 49 in the same plane as the low-speed shaft 52.

Referring now to Figure 6, there is illustrated an arrangement which comprises an epicyclic gear. In this arrangement, the power turbine 20 drives a high-speed shaft 60 carrying a high-speed pinion 61 which meshes with a gear 62 of a larger pitch circle diameter. The latter is carried at one end of an intermediate-speed shaft 63 which at its other end serves as the driving shaft for an epicyclic gear mechanism 64. The intermediate shaft is provided with a brake 65 which is anchored to stationary structure 66 of the marine vessel and is capable of bringing the whole assembly to rest. The brake comprises an operating mechanism 67.

The epicyclic gear comprises a first sun wheel 68 which is mounted on the intermediate shaft 63 and acts as the input gear, a second sun wheel 69 which is directly connected with the low-speed shaft 70 which carries the marine propeller 22 at its further end, and a third sun wheel 71 which is mounted on a hollow shaft 72 co-axial with and surrounding one of the aforementioned shafts, shown in this case to be the shaft 70. Meshing with the three sun wheels 68, 69, 71 are corresponding planet wheel elements 73, 74, 75 respectively forming parts of compound planet gear members each having a lay shaft 76 journalled in a planet carrier 77 arranged coaxial with and rotatable with respect to shafts 63, 70, and 72. Each set of planet wheel elements 73, 74, 75 mounted on a layshaft 76 rotate as one unit.

A clutch member 78 is arranged to be engageable in alternative positions with co-operating clutch members 79, 79a rotatable respectively with the planet carrier 77 or the shaft 72 carrying the third sun wheel 71, and is arranged to be held against rotation with respect to the stationary structure 66a of the marine vessel. The clutch member 78 is moved between its alternative positions by mechanism indicated at 79b.

In the position illustrated the third sun wheel 71 is held stationary by the clutch member 78 engaging the member 79a and thus on rotation of the shaft 63 the gear arrangement acts as an epicyclic gear, the planet gear members 73, 74, 75, 76 moving around the axis of the intermediate and low-speed shafts 63, 70. By a suitable selection of the gears, the low-speed shaft 70 is driven in a direction opposite to that of the intermediate speed shaft 63 and at a lower speed. However, with the planet carrier 77 held stationary by engagement of the clutch members 78, 79, the gear arrangement operates as a simple gear train with fixed layshafts and the low-speed shaft 70 will be driven in the same direction of rotation as the intermediate-speed shaft; in this case the shaft 72 rotates idly.

In operation, when it is desired to reverse the direction of rotation of the low-speed shaft 70, the brake 65 is applied through brake mechanism 67 bringing the intermediate speed shaft 63 and consequently the remainder of the epicyclic gear to a standstill, and the clutch member 78 is then disengaged from one of the members 79, 79a and is engaged with the other clutch member 79, 79a.

In the drive arrangements described above, it is desirable to prevent rotation of certain parts whilst the clutches 32, 37, or 78, 79, 79a are being operated, thereby to prevent "running away" of those parts, e. g. the power turbine 20, or the marine propeller 22, which may still be subjected to a torque.

For instance, in the epicyclic gear arrangement just described, there is a risk that, when the clutch member 78 is moving between the clutch members 79, 79a, the marine propeller will "run away." In the arrangements of Figures 1 to 5, however, the clutch mechanisms are positioned between the brake 45 and the power turbine 20, and consequently there is a risk that the power turbine 20 will "run away" during reversal; alternatively the brake may be positioned between the clutch mechanisms and the power turbine 20, in which case there will be a risk of the propeller shaft "running away" due to watermilling of the propeller if the vessel is under way.

Some clutch arrangements which may be adopted to avoid this difficulty will now be described.

Referring now to Figures 7 to 9, there is illustrated a clutch arrangement suitable for use with the transmissions of Figures 1 and 2, and 3 to 5. In Figure 7, the high-speed input shaft (corresponding to shaft 30 of Figures 1 to 5) is indicated at 80 and the second and third high-speed shafts are indicated at 81, 82 and they carry ahead and astern pinions 83, 84 respectively; pinions 83 and 84 correspond to pinions 33 and 38 of Figures 1 to 5.

Each of the shafts 81, 82 (Figures 8A, 8B) has a flange 85 at one end which flanges carry internally-toothed clutch members 86 to co-operate with corresponding clutch members 87 in the form of dished plates provided with dogs at their peripheries. The plates 87 are slidingly engaged on the shaft 80 through longitudinal splines 88 and they are displaceable axially of the shaft 80 by corresponding toggle mechanisms including toggle links 89, sliding sleeves 90 through which the toggle links are operated, and stops 91 rotatable with the shaft 80 to limit the pivoting of the toggle links 89 in one direction.

The sleeves 90 are axially displaceable by corresponding pressure rings 92 under control of forked levers 93 pivoted in stationary structure 94, there being parallel links 95 also pivoted in the stationary structure 94 and connected to the pressure rings 92 to maintain the rings 92 in planes at right angles to the axis of shaft 80.

The forked levers 93 are slidably engaged by their ends with links 96 connected for simultaneous operation to a piston 97 (Figure 7) operating in a cylinder 98. Springs 99 are provided to urge the outer ends of the levers 93 towards stops 100 on the free ends of the links 96.

Springs 101 are provided in the cylinder 98 to urge the piston 97 to a central position.

In Figures 7 and 8 the "ahead" clutch is shown engaged and the "astern" clutch is shown disengaged.

The change from "ahead" transmission to "astern" transmission, the brake 45 is applied and then piston 97 is displaced to the left thus moving the pressure rings 92 to the right. The pressure rings 92, the associated sleeves 90, and the toggle mechanisms 89 are so arranged that the clutch member 87 of the clutch being engaged comes into contact with its associated clutch member 86 before the other clutch member 87 is disengaged from its clutch member 86 so that "running away" of any part of the transmission is prevented.

After the change has been made, the piston is allowed to return to its central position under control of springs 101, and the toggles are maintained locked by the centrifugal loads in running.

If when changing from "astern" transmission to "ahead" transmission as shown in Figure 9, the clutch member 87 does not properly engage the clutch member 86 but their dogs abut, the associated spring 99 is compressed and as soon as the shaft 80 starts to turn due to the other clutch 86, 87 being disengaged and the dogs come out of line, the spring 99 (acting through lever 93, ring 92, sleeve 90 and toggle 89) forces the clutch members 86, 87 into engagement. The dogs will be suitably shaped to permit engagement under the spring load, the driving faces being axial, and the trailing face being inclined to the axial.

The toggle links 89 are so designed that, as will be clear from Figures 8A, 8B, the disengaged clutch tends to be held out of engagement and the engaged clutch held in engagement owing to the centrifugal load on the toggle links during rotation of the shaft 80.

In the second clutch arrangement (Figures 10, 11A, 11B) which is also suitable for use in the transmissions of Figures 1 and 2, and 3 to 5, friction clutches are used in addition to dog clutches, there being a friction clutch and a dog clutch by which the high-speed shaft 80 may be connected to the second high-speed shaft 81, and also a friction clutch and a dog clutch by which the high-speed shaft 80 may be engaged with the third high-speed shaft 82.

The friction clutch and dog clutch arrangement between the high-speed input shaft 80 and each of the second and third high-speed shafts 81, 82 comprises two friction clutch plates 102 splined at their outer diameter to a belled-out portion 103 at the end of the shaft 81, or 82, which belled-out portion encloses the clutch mechanism. A plate 104 closing the mouth of the belled out portion 103 and secured thereto carries a number of circumferentially disposed springs 105 which load the clutch plate 102 nearest the bell mouth in the direction away from the bell mouth. Between the clutch plates 102 and between the clutch plate 102 remote from the bell mouth and a plate 106 secured to the shaft 81 or 82 are two further annular clutch plates 107 which are splined to the high-speed shaft 80. The plate 104 also serves as a guide for a plurality of circumferentially-disposed axially-extending plungers 108 which form the operating mechanism of the clutch. An annular ring 109 is carried at the ends of the plungers 108 and is in engagement at its outer periphery with the associated shaft 81, or 82 through splines 110 and has a plurality of dogs 111 formed on its inner periphery. A plurality of co-operating dogs 112 are formed on the high-speed shaft 80, so as to be engageable with the dogs 111 on the annular ring 109 by axial movement of the ring. The operating plungers 108 also are formed with abutment portions 108a by means of which the friction clutch plates 102 are disengaged against the action of the springs 105 which tend to cause them to remain in engagement. The operating plungers 108 are moved axially through associated toggle links 113 and sliding sleeves 114 by coupled operating forks 115. The forks 115 are coupled by an operating rod 116 so that normally one clutch is engaged and the other disengaged.

Conveniently the belled portions 103 of the second and third high-speed shafts 81, 82 are arranged so as to face away from one another.

On movement of the operating forks 115 to change from "ahead" transmission to "astern" transmission, after application of the brake 45 to bring the assembly to rest, first the friction plates 102 of the free clutch are allowed to engage the associated plates 107 under the action of springs 105 due to movement of the abutments 108a out from contact with the clutch plates 102. During this movement the friction plates 102 of the clutch to be disengaged still remain in contact with their associated plates 107.

Further movement of the operating forks 115 completes the movements of the annular rings 109 to an extent necessary to disengage the initially engaged dogs 111, 112. This permits rotation of the shaft not held by the brake 45 (i. e. the propeller shaft if the brake is arranged to hold the turbine shaft, and vice versa) with a certain degree of slip taking place in the friction clutches. The initially disengaged dogs 111, 112 may then be engaged by further movement of the annular rings 109 and the plungers 108, full engagement of the dogs being ensured due to their relative rotation. The dogs in this arrangement are suitably shaped, as in the embodiment above described.

The final portion of the movement of the operating forks 115 causes the abutments 108a on the operating plungers 108 of the clutch arrangement of which the dogs 111, 112 are now disengaged, to abut the associated friction plate 102 thereby disengaging the friction clutch against the action of the springs 105.

Thus, when either of the dog-clutches is engaged, its associated friction clutch is engaged, and, while one dog clutch is being disengaged and the other engaged, both friction clutches are engaged.

The toggle mechanism in this embodiment, as in that above described, operates to lock both the engaged and disengaged clutches in position during operation. In the arrangements of Figures 7-11 the shafts 80, 81 and 82 and the pinions 83 and 84 correspond directly to the shafts 30, 31 and 32 and pinions 33 and 38 respectively of Figures 1-5.

Referring now to Figures 12 to 14, there is illustrated another clutch arrangement by means of which one clutch can be engaged before the other is disengaged.

In this arrangement the high-speed input shaft is indicated at 120 and this shaft drives a pinion 121 which is in constant mesh with a pinion 122 driving a parallel shaft 123.

The shaft 120 has rotatively mounted on it a second high-speed shaft 124 carrying a high-speed pinion 125 of the "ahead" train and the two shafts 120, 124 can be coupled together through a clutch arrangement 126.

The shaft 123 has rotatively mounted on it a third high-speed shaft 127 carrying the "astern" high-speed pinion 128 and the two shafts 123 and 127 can be drivingly coupled together through a clutch mechanism 129.

The arrangement shown in Figures 12-14 differs from those shown in Figures 1-5 in that instead of the high speed shaft such as 30 driven by the power turbine being clutched to a pair of shafts 31, 36 rotating in the same direction as the high speed shaft, one of which shafts 31 carries a pinion 33 meshing directly with a gear 34 of larger pitch circle diameter and the other of which shafts 36 carries a pinion 38 meshing with a further pinion 39 carried by a layshaft 40, which layshaft carries a pinion 41 meshing directly with the gear of larger diameter, the high-speed shaft 120 is clutched to one high-speed shaft 124 which rotates in the same direction and carries a pinion 125 meshing with an output gear of larger pitch circle diameter, and the high-speed shaft 120 carries a pinion 121 meshing directly with a pinion 122 carried by the layshaft 123, and the layshaft 123 is clutched to a further shaft 127 carrying a pinion 128 which meshes directly with the gear of larger diameter. It will be appreciated that this is an equivalent arrangement to those shown in Figures 1 and 2, and 3 to 5, the pinions 121, 122 of Figure 12 performing the function of pinions 38, 39 of Figures 1-5 and the pinions 125, 128 being the equivalent of pinions 33, 41 of Figures 1-5.

The high-speed shaft 120 may be connected to the power turbine, and the output shaft driven by the gear of larger pitch circle diameter may co-operate with the brake mechanism 45.

Alternatively where a reduction gear is interposed between the power turbine and the clutch arrangement (as for example in the arrangement shown in Figure 6) the brake mechanism may co-operate with the input shaft to the clutch arrangement, preferably between the clutch arrangement and the reduction gear, and in this case the output shaft from the clutch arrangement may carry the propeller.

It will be appreciated that the type of clutches shown in Figures 12-14 may be used in an arrangement such as that shown in Figures 1 and 2 to clutch the high speed input shaft to the coaxial pinions, and in this case the clutches 126, 129 of Figures 12-14 may be arranged in a manner similar to the clutches shown in Figure 7.

An actuating mechanism is provided for the clutch mechanisms 126, 129 so that these clutch mechanisms may be simultaneously operated, the one being engaged and the other disengaged. The operating mechanism comprises a double forked, rocking lever 130 which is pivoted intermediate its ends and which by means of the forks co-operates with the two clutch mechanisms 126, 129.

Referring now more specifically to Figure 13, it will be seen that each of the clutch mechanisms 126, 129 comprises a sleeve 131 engaged by helical splines 132 on the corresponding shaft 124, 127 so as to be capable of limited axial movement with respect to the shaft. The splines 132 on the shaft 124 are of opposite hand to those on shaft 127. Each sleeve 131 has on it a bell-mouthed flange 133 the periphery of which is formed internally with dogs 134. The dogs 134 co-operate with dogs 135 formed on a radial flange 136a carried by a sleeve 136 mounted on the shaft 120 in the case of the clutch mechanism 126 and on the shaft 123 in the case of the clutch mechanism 129, and with pawls 137 carried on pivot pins 138 journalled in the flange 136a and carrying at their opposite ends cam elements 139. The pawls 137 are on the side of the dogs 135 adjacent the associated dogs 134.

Slidably mounted on the sleeve 136 there is a further sliding sleeve 140 having a pair of spaced flanges 141 to form a channel to be engaged by the ends of the operating fork 130. It will be seen that when the lever 130 is rocked about its pivot the sleeves 140 are moved axially on the sleeves 136.

Each sleeve 140 has at its end adjacent the flange 136a, a radial flange 142 having at its periphery an axial flange 143 with an internal cam surface 144 which is adapted to engage the cams 139 to rock the associated pawls out from engagement with the dogs 134.

In operation, to change from, say, "ahead" transmission to "astern" transmission, the brake is applied to bring the transmission to a standstill and the lever 130 is then rocked (in a clockwise direction as viewed in Figure 13), thus moving the sleeve 140 of the clutch mechanism 126 to the right and the sleeve 140 of the clutch mechanism 129 to the left. During the first part of this movement the flange 143 of the sleeve 140 associated with the clutch mechanism 129 moves clear of the corresponding cams 139 and the associated pawls 137 are thus free to move outwardly under the influence of a spring 137a into engagement with the dogs 134 on the belled flange 133. During this part of the movement the dogs 134 and 135 of the clutch mechanism 126 remain in engagement; thus both clutches are engaged and "running away" of any part of the transmission is prevented.

On further movement of the sleeves 140, the cam surface 144 on the flange 143 of the clutch mechanism 126 engages the associated cams 139 and holds the pawls 137 in a position in which they are clear of the path of the dogs 134 and at the same time the flange 143 abuts against the edge of the belled flange 133 of the clutch mechanism 126 displacing the sleeve 131 to the right and disengaging the dogs 134, 135 of the clutch mechanism 126. The sleeve 131 is moved to such an extent that the dogs 134 of the clutch mechanism 126 are in the plane of the pawls 137. The "ahead" train is now disengaged but the reverse train is still operative through the pawls 137 of the clutch mechanism 139 being engaged with the dogs 134 of this clutch mechanism.

The power turbine will now start to rotate (where the brake is between the propeller and the clutch) and the two shafts 120, 123 consequently will also start to rotate but the shafts 124, 127 will not rotate due to the brake 45 still being applied. Since, however, the sleeve 131 associated with the shaft 127 is being driven by the pawls 137 it will move along its helical spline connection with the shaft 127 bringing the dogs 134 into engagement with the dogs 135, thus engaging the positive clutch of the clutch mechanism 129. Any further rotation of the power turbine is then prevented until the brake is released. On release of the brake the drive from the power turbine is taken up through the "astern" train.

The clutch arrangements shown in Figures 7–9, 10, 11A and 11B, and 12–14, although described in relation to the constructions of Figures 1–5, may be adapted as will be clear to one skilled in the art to the construction of Figure 6 to effect the engagement of member 78 alternatively to clutch members 79, 79a in such a manner that the member 78 is constrained to engage member 79 at or before the moment when the member 79a is released from engagement with member 78, and vice versa.

It will be seen that the invention permits a change over to be made from ahead to astern drive, even though both the propeller-shaft and the turbine-shaft are subjected to a torque.

A further advantage of the embodiments described is that the reduction gear ratios of both the ahead and astern trains can conveniently be made the same, and thus handing of the engines may be avoided in a twin-engine installation.

We claim:

1. For a turbine engine of the kind having a power turbine which is connected through gearing to a non-reversible-pitch marine propeller, a transmission between the power turbine and the propeller comprising an input shaft connected to the power turbine to be driven thereby, an output shaft connected to the propeller to drive it, a first gear train adapted for connection between said input and output shafts and comprising first clutch means, said first gear train being adapted on engagement of said first clutch means to cause a drive to be transmitted from said input shaft to said output shaft to cause said output shaft to rotate in one sense of rotation, a second gear train adapted for connection between said input and output shafts and comprising second clutch means, said second gear train being adapted on engagement of said second clutch means to cause a drive to be transmitted from said input shaft to said output shaft to cause said output shaft to rotate in the other sense of rotation, braking means for bringing the assembly including the propeller and the power turbine to a standstill, operating means for the braking means, and actuating means for selective engagement of said first and said second clutch means, said actuating means being operable to effect changeover of drive from one of said gear trains to the other when the assembly has been brought to a standstill.

2. For a turbine engine of the kind having a power turbine which is connected through gearing to a nonreversible-pitch marine propeller, a transmission between the power turbine and the propeller comprising an input shaft connected to the power turbine to be driven thereby, an output shaft connected to the propeller to drive it, a first pinion co-axial with said power-turbine-driven input shaft, first clutch means adapted to connect said first pinion and said input shaft, a gear of larger pitch circle diameter meshing with said first pinion and connected to said output shaft to drive it, a second pinion co-axial with said input shaft, second clutch means adapted to connect said second pinion and said input shaft, a layshaft, a third pinion drivingly connected to said layshaft and meshing with said second pinion, a fourth pinion drivingly connected to said layshaft and meshing with said gear of larger pitch circle diameter, braking means for bringing the assembly including the propeller and the power turbine to a standstill, operating means for said breaking means, and actuating means for selective engagement of said first and said second clutch means.

3. For a turbine engine of the kind having a power turbine which is connected through gearing to a non-reversible-pitch marine propeller, a transmission between the power turbine and the propeller comprising an input shaft connected to the power turbine to be driven thereby, an output shaft connected to the propeller to drive it, a first gear train adapted for connection between said input and output shafts and comprising a first dog clutch comprising a pair of dog clutch members whereof a first dog clutch member is drivingly connected to said input shaft and a second dog clutch member is drivingly connected to said output shaft, said first gear train being adapted on engagement of said first dog clutch to cause a drive to be transmitted from said input shaft to said output shaft to cause said output shaft to rotate in one sense of rotation, a second gear train adapted for connection between said input and output shafts and comprising a second dog clutch including a pair of dog clutch members whereof one of said members is drivingly connected to said input shaft and the other of said members is drivingly connected to said output shaft, said second gear train being adapted on engagement of said second dog clutch to cause a drive to be transmitted from said input shaft to said output shaft to cause said output shaft to rotate in the other sense of rotation, braking means for bringing the assembly including the propeller and the power turbine to a standstill, operating means for the braking means, and actuating means for selective engagement of said first and second dog clutches comprising means including a direct linkage connection for disengaging each of said dog clutches and means including a resilient connection for engaging said dog clutches, said engaging and disengaging means being adapted for simultaneous operation to disengage one of said pairs of dog clutch members and to urge the other of said pairs of dog clutch members into engagement.

4. For a turbine engine of the kind having a power turbine which is connected through gearing to a non-reversible-pitch marine propeller, a transmission between the power turbine and the propeller comprising an input shaft connected to the power turbine to be driven thereby, an output shaft connected to the propeller to drive it, a first gear train adapted for connection between said input and output shafts and comprising a first dog clutch including a pair of dog clutch members whereof one member is drivingly connected to said input shaft and the other member is drivingly connected to said output shaft, a first friction clutch whereof one member is drivingly connected to said input shaft and the other member is drivingly connected to said output shaft, and resilient means to load said co-operating friction clutch means into engagement, said first gear train being adapted on engagement of said first dog clutch to cause a drive to be transmitted from said input shaft to said output shaft to cause said output shaft to rotate in one sense of rotation, a second gear train adapted for connection between said input and output shafts and comprising a second dog clutch whereof one member is drivingly connected to said input shaft and the other member is drivingly connected to said output shaft, a second friction clutch whereof one member is drivingly connected to said input shaft and the other member is drivingly connected to said output shaft, and resilient means to load said co-operating friction clutch members into engagement, said second gear train being adapted on engagement of said second dog clutch means to cause a drive to be transmitted from said input shaft to said output shaft to cause the output shaft to rotate in the other sense of rotation, braking means for bringing the assembly including the propeller and the power turbine to a standstill, operating means for the braking means, and actuating means for selective engagement of said first and said second dog clutch means adapted successively to engage the disengaged friction clutch, to disengage the engaged dog clutch, to urge the disengaged dog clutch into engagement, and to disengage the engaged friction clutch.

5. For a turbine engine of the kind having a power turbine which is connected through gearing to a non-reversible-pitch marine propeller, a transmission between the power turbine and the propeller comprising an input shaft connected to the power turbine to be driven thereby, an output shaft connected to the propeller to drive it, a first pinion drivingly connected to said input shaft, a second pinion co-axial with said input shaft, first clutch means adapted to connect said second pinion and said input shaft, a gear meshing with said second pinion and connected to said output shaft to drive it, a layshaft parallel with said input shaft, a third pinion drivingly connected to said layshaft and in constant mesh with said first pinion, a fourth pinion co-axial with said layshaft, second clutch means adapted to connect said fourth pinion and said layshaft, said fourth pinion meshing with said gear connected to said output shaft, braking means for bringing the assembly including the propeller and the power turbine to a standstill, operating means for said braking means, and actuating means for selective engagement of said first and second clutch means.

6. A transmission as claimed in claim 5 wherein said first and said second clutch means each comprises a pair of dog clutch members axially movable relative to one another, pawls carried by one of said pair of dog clutch members and engageable with the other of said pair of members when said dog clutch members are disengaged, releaseable means to hold the pawls against engagement with the dog clutch members, torque responsive means to move said dog clutch members relatively towards engagement, means to displace said members from engagement, and means interconnecting the mechanism of said first and second clutches to operate said releaseable means to allow the pawls of the clutch to be engaged to engage said other dog clutch member and then to render operative the releaseable means of the dog clutch to be disengaged to hold the associated pawls from engagement with the other dog clutch member and then to operate said means to displace said dog clutch members of the clutch to be disengaged thereby to disengage the engaged dog clutch members.

7. For a turbine engine of the kind having a power turbine which is connected through gearing to a non-reversible-pitch marine propeller, a transmission between the power turbine and the propeller comprising an input shaft connected to the power turbine to be driven thereby, a compound epicyclic reduction gear connected to said input shaft to be driven thereby and having an output shaft, said epicyclic gear comprising a stationary structure and a pair of reaction members so adapted and arranged that by locking one of said members to said structure the output shaft rotates in one direction and by locking the other of said members to said structure the output shaft rotates in the opposite direction, first clutch means adapted to connect said one reaction member to said structure, second clutch means adapted to connect said other reaction member to said structure, said output shaft being connected to said propeller to drive it, braking means for bringing the assembly including the propeller and the power turbine to a standstill, operating means for said braking means, and actuating means for selective engagement of said first and said second clutch means.

8. For a turbine engine of the kind having a power turbine which is connected through gearing to a non-reversible-pitch marine propeller, a transmission between the power turbine and the propeller comprising an input shaft connected to the power turbine to be driven thereby, a compound epicyclic reduction gear having a stationary structure, a first sun gear connected to said input shaft to be driven thereby, a planet carrier, a plurality of planet gears carried by said planet carrier and adapted to rotate together, one of said planet gears meshing with said first sun gear, an output shaft, an output gear connected to said output shaft and meshing with another of said planet gears, and a reaction gear meshing with one of said plurality of planet gears, first clutch means adapted to connect said reaction gear to said structure, second clutch means adapted to connect said planet carrier to said structure, whereby when said first clutch means is engaged the output shaft rotates in one direction and when said second clutch means is engaged the output shaft rotates in the opposite direction, said output shaft being connected to the propeller to drive it, braking means for bringing the assembly including the propeller and power turbine to a standstill, operating means for said braking means, and actuating means for selective engagement of said first and second clutch means.

References Cited in the file of this patent

UNITED STATES PATENTS

| | | |
|---|---|---|
| 410,012 | Otto | Aug. 27, 1889 |
| 757,331 | Mead | Apr. 12, 1904 |
| 760,218 | Lefinski | May 17, 1904 |
| 1,394,448 | Sitney | Oct. 18, 1921 |
| 1,701,403 | Coykendall | Feb. 5, 1929 |
| 1,784,354 | Haussman | Dec. 9, 1930 |
| 2,469,743 | Newton | May 10, 1949 |
| 2,613,773 | Gilfillan | Oct. 14, 1952 |

FOREIGN PATENTS

| | | |
|---|---|---|
| 498,583 | Great Britain | Jan. 10, 1939 |